April 24, 1962  L. F. TUMEY  3,030,688
MOLDING APPARATUS
Filed March 30, 1959  4 Sheets-Sheet 1
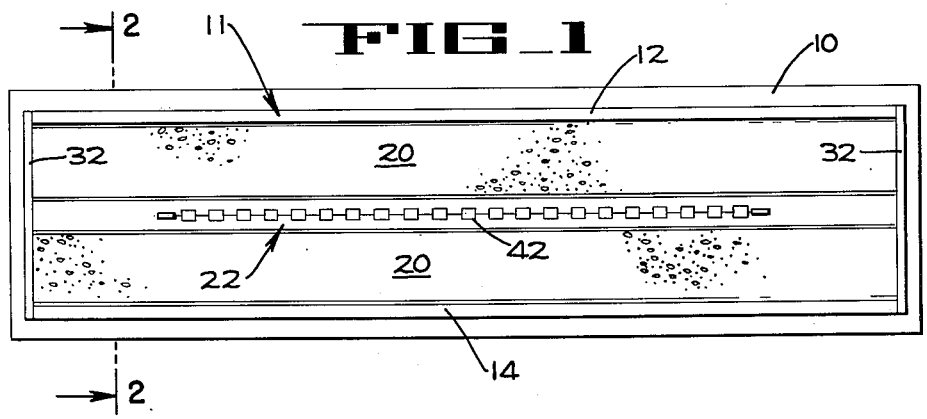
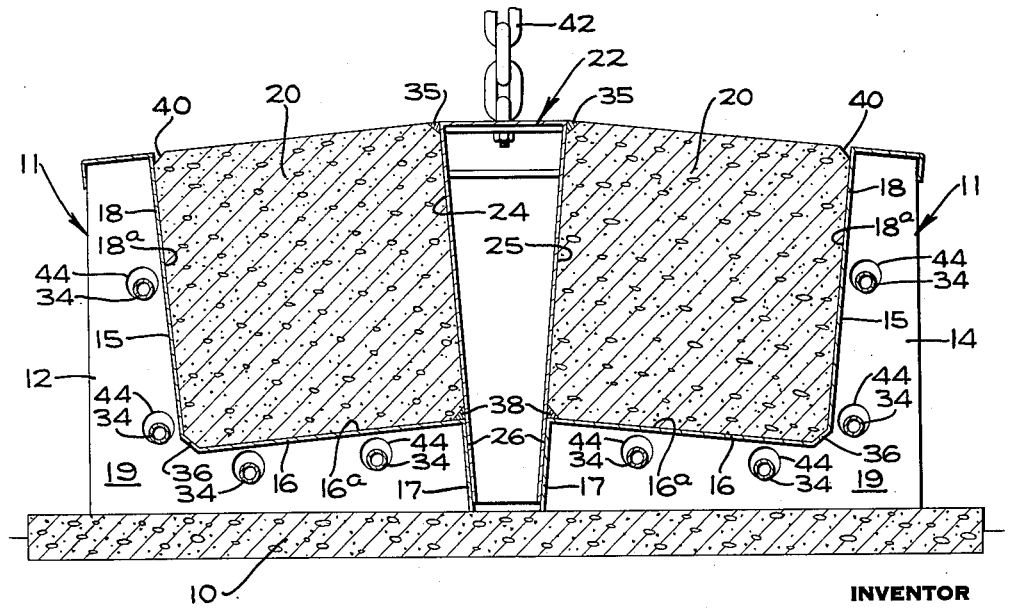
INVENTOR
LAWRENCE F. TUMEY
BY Hans G. Hoffmeister
ATTORNEY April 24, 1962
L. F. TUMEY
3,030,688
MOLDING APPARATUS
Filed March 30, 1959
4 Sheets-Sheet 2
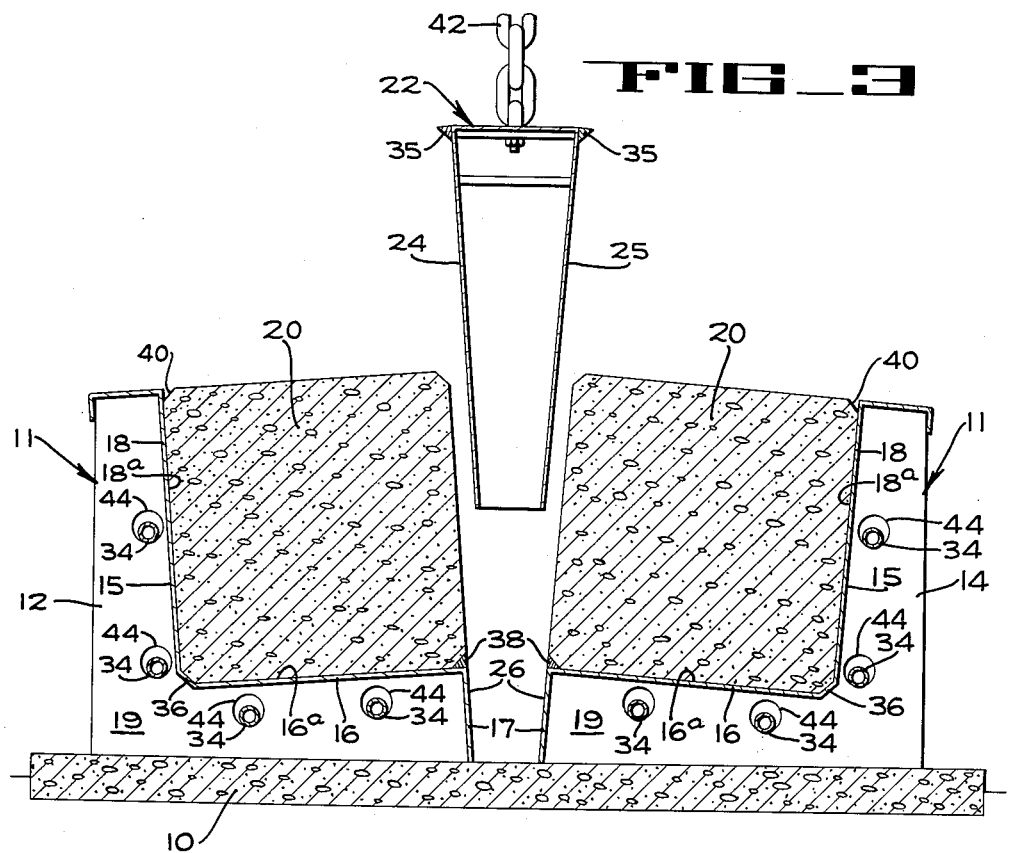
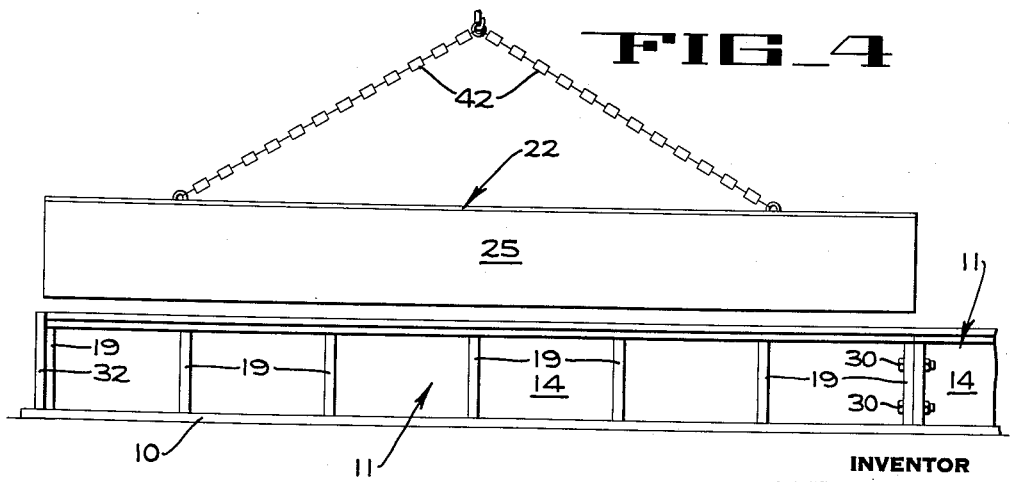
INVENTOR
LAWRENCE F. TUMEY
BY Hans G. Hoffmeister.
ATTORNEY April 24, 1962 — L. F. TUMEY — 3,030,688
MOLDING APPARATUS
Filed March 30, 1959 — 4 Sheets-Sheet 3
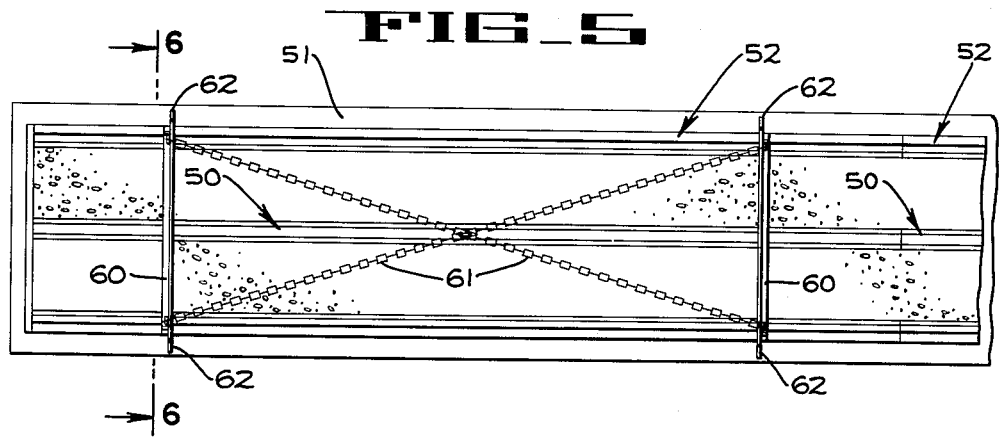
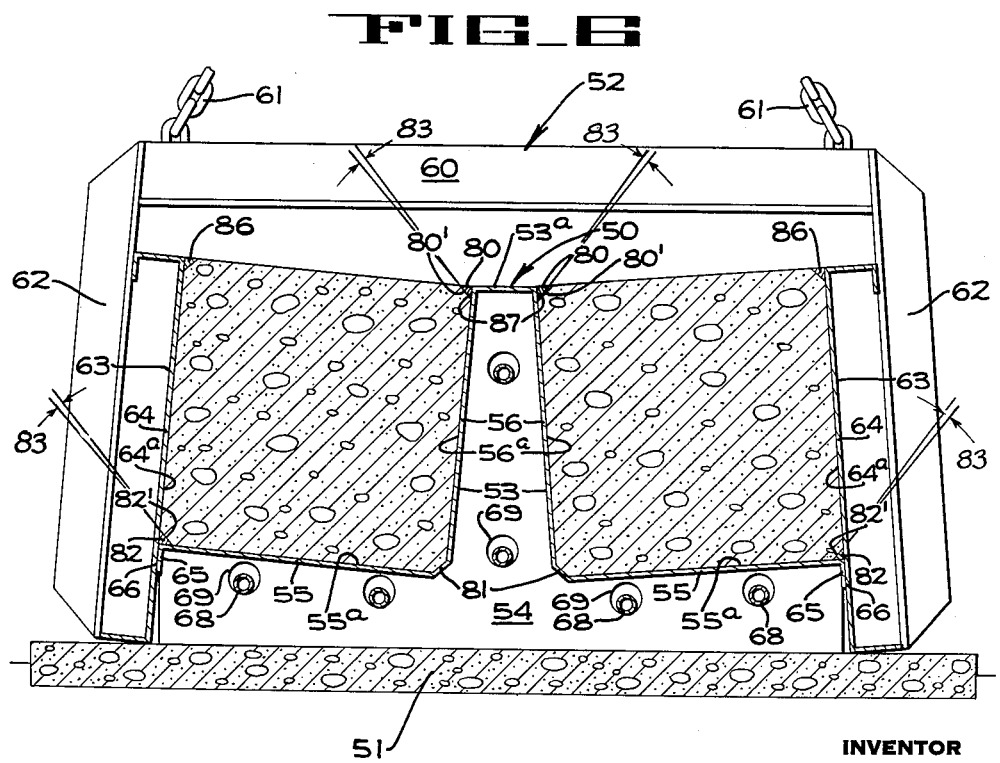
INVENTOR
LAWRENCE F. TUMEY
BY Hans G. Hoffmeister
ATTORNEY April 24, 1962 L. F. TUMEY 3,030,688
MOLDING APPARATUS
Filed March 30, 1959 4 Sheets-Sheet 4
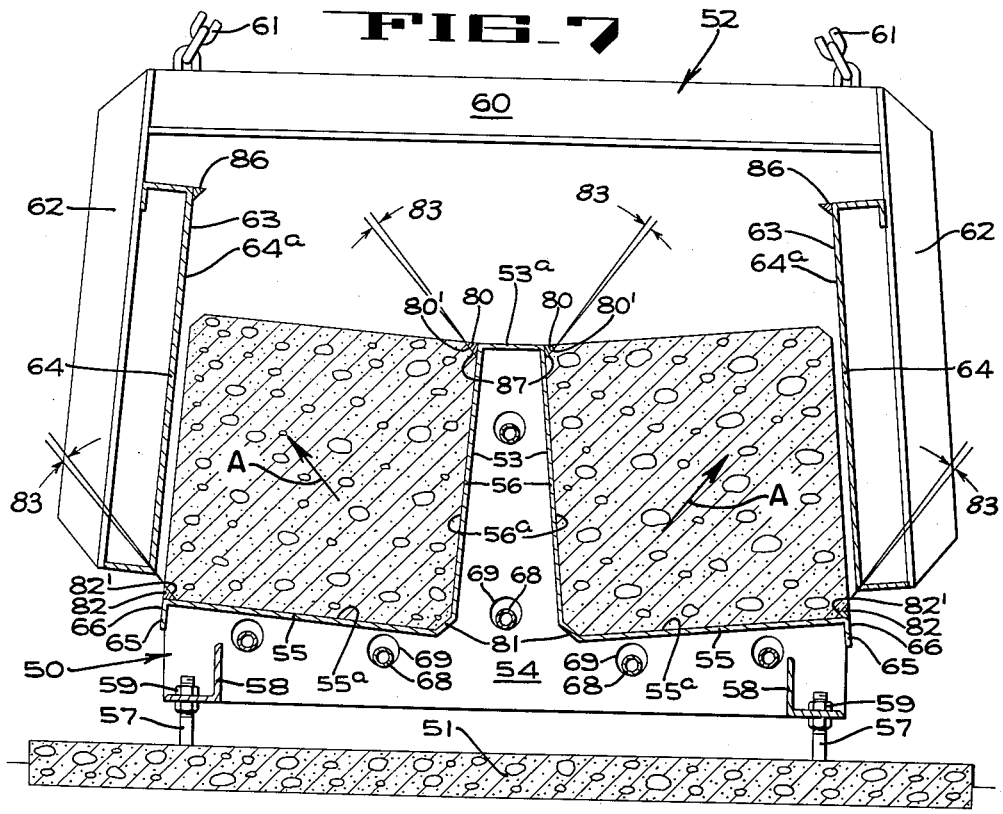
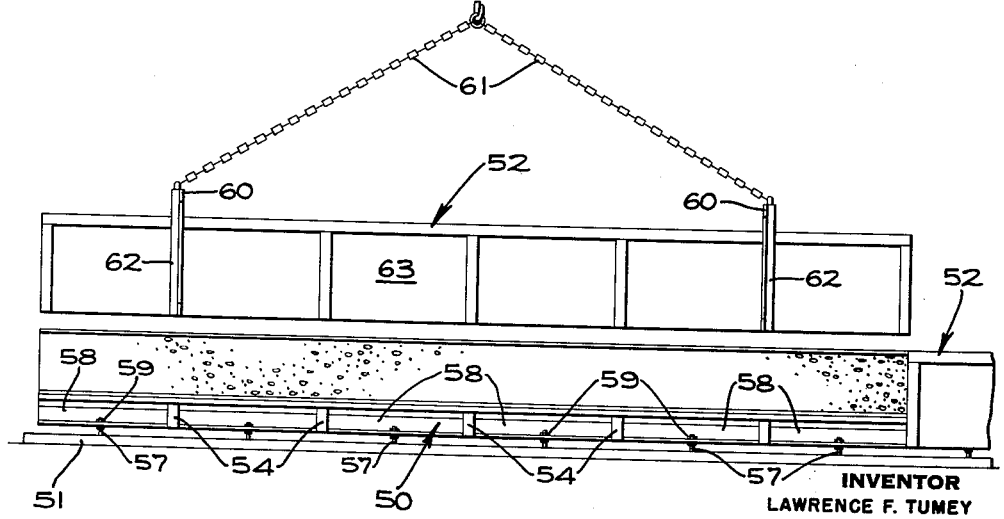
INVENTOR
LAWRENCE F. TUMEY
BY Hans G. Hoffmeister
ATTORNEY 3,030,688
MOLDING APPARATUS
Lawrence F. Tumey, Lakeland, Fla., assignor to FMC Corporation, a corporation of Delaware
Filed Mar. 30, 1959, Ser. No. 802,729
4 Claims. (Cl. 25—121)

This invention pertains to molding apparatus and more particularly relates to an improved mold for forming concrete structural members.

It has long been the practice to cast prestressed concrete structural members, such as concrete piling, in yards which are not at the site where the piling will be used. This is done so that all of the facilities for form handling, concrete pouring, prestressing, form heating, and the like, can be maintained at one central location. The yard casting practice is less expensive than would be the practice of casting the piling at the site of use; it, however, remains an expensive operation.

By far the major expense contributing to the cost of a beam is the cost of the labor required to place and remove the forms. This is true because conventional molding apparatus frequently included a great number of separate removable parts. Bolts and nuts, for example, are usually required to fasten the various parts of the mold together in their correct positions of alignment. Such fasteners provide a mold with the requisite amount of rigidity and ensure tight joints, but results in apparatus which requires a large amount of labor in use.

It is an object of the invention to provide an improved apparatus for molding concrete structural members.

Another object is to provide molding apparatus which requires a small amount of labor to set up and remove.

Another object is to provide molding apparatus which can be quickly and simply set up and removed by a power operated machine such as a crane.

Another object is to provide a two-piece molding apparatus which automatically provides a concrete-tight wedged seal when one portion of the apparatus is lowered onto the other portion.

Another object is to provide an improved molding apparatus from which the product may be removed by the application of a vertical force only.

Another object is to provide an improved two-piece mold having edge chamfering devices made integral therewith.

Another object is to provide a two-piece form having a removable portion which is automatically oriented in its correct position when lowered onto the other portion of the form.

Another object is to provide an adjustable mounting for a mold.

Another object is to provide an improved molding apparatus for simultaneously casting two concrete piles.

These and other objects and advantages of the invention will be apparent from the following description taken in connection with the following drawings, in which:

FIG. 1 is a plan of one embodiment of the molding apparatus.

FIG. 2 is an enlarged section taken on line 2—2 of FIG. 1.

FIG. 3 is a section similar to FIG. 2 but showing parts of the mold in a raised position.

FIG. 4 is a side elevation of the parts of the mold shown in FIG. 1, with a fragment of a second mold shown connected thereto to illustrate the assembly of an extra-long mold.

FIG. 5 is a plan of another embodiment of the molding apparatus.

FIG. 6 is an enlarged section taken on line 6—6 of FIG. 5.

FIG. 7 is a section similar to FIG. 6 but showing parts of the mold in a raised position, and illustrating an adjustable mounting means for the mold.

FIG. 8 is a side elevation of the parts of the mold shown in FIG. 7.

The molding or forming apparatus of the invention is disclosed in two embodiments. The first embodiment is illustrated in FIGS. 1–4 and is distinguished by the provision of a removable wedge-shaped side-forming section which is centrally placed between two stationary sections of the apparatus to fashion a pair of elongate cavities in which the product is molded. The second embodiment is illustrated in FIGS. 5–8 and is distinguished by the provision of a removable, side-forming section of inverted U-shape which is placed over a centrally located stationary section of the apparatus to fashion the pair of elongate cavities.

The forming apparatus of the invention disclosed in connection with FIGS. 1–4 includes a foundation 10 of suitable dimensions for supporting a stationary portion 11 of the mold. The stationary portion is a welded steel structure and comprises two L-shaped sections 12 and 14 which are separated slightly and face each other as shown in FIG. 2.

Each of the L-shaped sections 12 and 14 is constructed of a plate 15 which is bent along its length to an angle of approximately 90° to provide a bottom wall 16 and a side wall 18 which provide the bottom and side forming surfaces 16a and 18a, respectively, for a beam 20 which is being molded. A continuation 17 (FIG. 3) of the plate 15 is bent downwardly from the bottom wall 16 to lie in a plane which is substantially parallel to the plane of the surface 18a. This continuation 17 of the plate 15 provides a surface 26 which assists in sealing the molding cavity. A number of vertical L-shaped stiffening plates 19 (FIGS. 2–4) are welded to the plates 15, said stiffening plates being spaced apart longitudinally of the plates 15 at intervals which vary with the strength requirements of the mold.

The two L-shaped sections 12 and 14 are fastened to the foundation 10 by any suitable device, as by bolts (not shown) and set apart slightly (FIG. 3) in order to accommodate a welded steel, wedge-shaped forming member 22 centrally between them. Two side surfaces 24 and 25 of the wedge member 22 are constructed at a slight angle, 5° for example, relative to the vertical, and the various members are shaped so that surface 24 is parallel to the side wall surface 18a and to the mating surface 26 on the L-shaped section 12, while wedge surface 25 is parallel to the side wall surface 18a and to the mating surface 26 on the L-shaped section 14.

The wedge-shaped forming member 22 is lowered into place when the molding apparatus is being set up to receive concrete for a casting and, because of the weight of the wedge 22, the surfaces 24 and 25 move into wedged engagement with the surfaces 26. This close contact automatically orients the upper portions of each of the surfaces 24 and 25 of the wedge in a plane substantially parallel to the plane of the associated surface 18a and also automatically provides a sealed joint between the surfaces 24, 25 and 26 which prevents fluid concrete leakage. It will be noted that no bolts and nuts or other connecting devices are required to set up the two portions of the mold.

When the wedge-shaped member 22 is set in place, as shown in FIG. 2, and end plates 32 (FIG. 1) placed at each end, the molding apparatus is adapted to receive fluid concrete in the molding cavity on each side of the wedge-shaped member 22. The side wall surfaces 18a—24 and 18a—25 are in substantially parallel planes and, when the elongate molding cavities are filled completely, two piles having square cross-sections are formed. Structure of this nature is known in the art as dual-forming or dual-casting apparatus.

Suitable chamfer strips can be attached to the stationary and vertically removable portions of the molding apparatus to provide for the chamfering of three of the longitudinal corner edges of the square product. Two such longitudinal chamfer strips 35 (FIG. 3) are shown attached to the wedge member 22. The other two longitudinal edges of each pile are chamfered by a formed corner 36 (FIG. 3) in each plate 15, and by a chamfer strip 38 which is secured in the mold in contact with the surface 16a. The fourth beveled corner 40 of each piling 20 is provided by hand troweling.

When the wedge 22 and the chamfer strips 35 and 38 are in place, concrete is poured into the two mold cavities. The strips 35 and 38 and the inclined corner 36 automatically form three chamfered longitudinal edges on the piling. After a suitable interval, the upper beveled edge 40 is formed on each piling by hand troweling. When the concrete has set sufficiently, the wedge 22 is moved vertically upwardly by means of a chain 42, as seen in FIG. 3, to raise the side wall surfaces 24 and 25 and the chamfer strips 35 out of contact with the pile. It will be particularly noted that, as soon as the wedge 22 is removed, all of the upwardly facing surfaces of the piling are exposed, and each piling can then be separated from the mold by an upward vertical movement. Thus, the fact that the mold is tilted at approximately 5° relative to the vertical makes possible the removal of the product when only one wall of the mold has been removed. The amount of tilting or rotation of the mold may vary up to a point where excessive inclination of the top surface of the piling causes finishing or screeding problems due to the plastic flow of the concrete before hardening. It has been found that a tilting of 5 degrees from the vertical, which provides a total wedge angle of 10 degrees, is satisfactory.

The L-shaped sections 12 and 14 are made in convenient lengths which can be joined together to form extra-long piles. Two sections 14 are shown joined together by connectors 30 shown in FIG. 4. The wedges 22 are made in lengths which, for convenience, conform to the length of the L-shaped sections.

The time required for the concrete to set sufficiently to permit the removal of the wedge 22, and subsequent removal of the beam, varies with conditions but may be speeded considerably by introducing hot water or steam for heating the beam. The hot fluid may be introduced to the apparatus through pipes 34 (FIGS. 2 and 3) which extend longitudinally along the molds through openings 44 in the stiffening plates 19 of the L-shaped sections 12 and 14.

Another embodiment of the invention for dual-forming of prestressed concrete piling is illustrated in FIGS. 5–8. The side surfaces of the two piles dual-formed by this embodiment are inclined toward the center of the apparatus to provide form-relief between a removable upper portion 52 of the mold and a stationary lower portion 50 of the mold.

The lower portion 50 comprises two steel plates 53 which are connected by a web 53a and are each bent along their lengths to an angle of approximately 90°. Several upright stiffening members 54 (FIGS. 6–8) are welded to the plates 53 of the stationary portion 50 to give the mold the required rigidity. Each plate 53 has a bottom wall 55 and a side wall 56 which form the bottom and side walls, respectively, of the mold and have planar surfaces 55a and 56a, respectively.

The lower mold portion 50 may be bolted directly to a foundation 51, as seen in FIG. 6, or it may be adjustably supported on a plurality of studs 57 (FIGS. 7 and 8) which are fixed in and project upwardly from the foundation. The studs 57 pass through openings in angle bars 58, welded between adjacent stiffening members 54, and are locked to the bars by nuts 59. This adjustable arrangement provides means for leveling the metal forms to overcome flatness discrepancies in the foundation.

An extension 65 from each plate 53 extends downwardly from the wall 55 to form a lip which lies in a plane substantially parallel to the plane of the adjacent side forming wall 56. A surface 66 on the lip assists in sealing the cavity of the mold. Heating pipes 68 may be placed in holes 69 in the upright members 54 of the stationary portion 50 for providing heat to aid in curing the product.

The removable portion 52 of the mold (FIGS. 5 and 6) includes two transverse members 60 which have two crossed chains 61 connected to their respective ends to facilitate the lifting of the removable portion. A leg 62 projects downwardly from each end of each transverse member 60.

The two legs 62 (FIGS. 7 and 8) on each side of the removable portion 52 support a long channel member 63, and each channel member has a plane surface that forms a side wall 64 of a molding cavity. The wall 64 has a surface 64a which is constructed to lie in a plane which is slightly inclined, at 5° for example, relative to the vertical and is substantially parallel to the opposed side wall surface 56a. When lowered from the position shown in FIG. 7 each of the surfaces 64a engages and wedges against the respective mating surface 66 of the lips 65 constructed on the stationary portion 50 of the apparatus. The surfaces 64a and 66 thereby automatically seal the two-piece molding apparatus against fluid concrete leakage and automatically orient the side surfaces of the mold in substantially parallel planes, thus providing a mold cavity having a square cross sectional configuration.

Suitable chamfer strips are attached to the stationary and to the removable portions of the mold to provide for the chamfering of each longitudinal edge of the square product. Two such longitudinal chamfer strips 86 (FIG. 7) are shown attached to the removable portion 52. The other three longitudinal edges of each pile are chamfered by a formed corner 81 (FIG. 7) in each plate 53, and two opposed chamfer strips 80 and 82, connected to the walls 56 and 55, respectively.

The inner plane surfaces 80' and 82' of the strips 80 and 82, respectively, which oppose each other diagonally across the mold cavity (FIG. 7) are not made parallel to each other but diverge outwardly from parallelism by an angle of divergence 83. An angle of divergence of 5° is satisfactory to provide sufficient relief so that the molded pile may be removed from between these surfaces.

When the removable mold member 52 has been lowered to the position of FIG. 6 and the chamfer strips 80, 82 and 86 are in place, concrete is poured into the two mold cavities. When the concrete has set sufficiently, the mold member 52 is lifted vertically upwardly, as seen in FIG. 7, to raise the side wall surfaces 64a and the chamfer strips 86 out of contact with the molded pile. Each pile may then be taken from the mold by moving it in a direction, indicated generally by arrow A (FIG. 7). Since the inner faces 80' and 82' of the chamber strips 80 and 82, respectively, diverge outwardly 5 degrees from parallelism, the molded pile may be moved away from both surfaces 80' and 82' simultaneously.

As soon as the strip 80 of each mold cavity has been cleared, the pile may be moved vertically upwardly.

If the inner, upper chamfered corners 87 (FIG. 7) on the piles are made by hand troweling, the product will be free for removal by an unobstructed vertical movement.

While the invention has been shown and described in two embodiments, it should be noted that various changes may be made therein without departing from the spirit of the invention as defined in the appended claims.

Having thus described the invention, what is believed to be new and desired to be protected by Letters Patent is:

1. In a mold for the dual casting of concrete piles; stationary form means comprising two horizontally spaced opposed side walls, each of said walls being inclined upwardly and away from a vertical plane disposed centrally between said side walls, two horizontally spaced bottom walls, each bottom wall being connected to and disposed perpendicular to an adjacent one of said side walls, and a pair of sealing walls, each sealing wall depending from one of said bottom walls in a plane perpendicular to said one bottom wall; and a wedge-shaped movable form member arranged to be moved vertically downwardly in said central vertical plane to a position between said spaced bottom walls, said movable form member comprising two side walls, each of which is parallel to and arranged to be positioned opposite one of said stationary side walls and in wedged contact with the sealing wall associated with said one stationary side wall whereby to form two open top molding cavities one on each side of said wedge member and defined by a bottom wall, a stationary side wall and a movable side wall.

2. In a mold for the dual casting of concrete piles: stationary form means comprising two horizontally spaced side walls, each of said walls being inclined upwardly and toward a vertical plane disposed centrally between said side walls, two horizontally spaced bottom walls, each bottom wall being connected to and disposed perpendicular to an adjacent one of said side walls, and a pair of sealing walls, each sealing wall depending perpendicular from an adjacent one of said bottom walls; and an inverted U-shaped movable form member arranged to be moved downwardly and having spaced side walls, each movable side wall being disposed parallel to and opposite one of said side walls on said stationary form and in wedged contact with one of said sealing walls whereby each pair of opposed side walls and an associated bottom wall provides an open top molding cavity.

3. Apparatus for molding a beam having a rectangular cross-section and chamfered longitudinal edges, said apparatus comprising: a stationary form member; and a vertically movable form member cooperating therewith to define a mold cavity; said stationary form member having a first wall arranged to form the bottom of the beam, a second wall arranged to form one side of the beam, an inclined corner wall portion between said first and second walls arranged to form a chamfered longitudinal edge on the beam between the bottom of the beam and said one side of the beam, and diagonally opposed chamfering strips carried respectively by said first and second walls diverging outwardly from a plane bisecting the space between said side walls for forming two chamfered longitudinal edges on the beam and permitting free withdrawal of said beam from said stationary form member; said movable form member having a wall adapted to form the other side wall of the beam and having a chamfering strip connected thereto for forming the fourth chamfered longitudinal edge on the beam.

4. In a mold for the dual casting of concrete piles, a stationary form member comprising two horizontally spaced side walls, each of said side walls being inclined symmetrically from a vertical plane disposed between said side walls, two horizontally spaced bottom walls, each bottom wall being connected to and disposed perpendicular to an adjacent one of said side walls, and a pair of sealing walls, each sealing wall depending perpendicular from an adjacent one of said bottom walls, and a vertically movable form member having two oppositely inclined side walls, each of said inclined side walls having an upper portion positioned opposite and parallel to one of said stationary side walls defining part of the mold cavity and a lower portion in face-to-face sealing engagement with one of said sealing walls, the oppositely inclined lower portions of said movable form member and said sealing walls providing a wedging engagement between said movable form member and said stationary form member.

References Cited in the file of this patent

UNITED STATES PATENTS

| | | |
|---|---|---|
| 772,032 | Ferguson | Oct. 11, 1904 |
| 1,025,508 | Caldwell | May 7, 1912 |
| 1,214,571 | Melde | Feb. 6, 1917 |
| 1,890,412 | Rogers | Dec. 6, 1932 |
| 2,021,210 | Thorn | Nov. 19, 1935 |
| 2,193,413 | Wright | Mar. 12, 1940 |
| 2,306,107 | Henderson | Dec. 22, 1942 |
| 2,445,894 | Troiel | July 27, 1948 |
| 2,495,100 | Henderson | Jan. 17, 1950 |
| 2,535,127 | Frei | Dec. 26, 1950 |
| 2,571,417 | Buchanan | Oct. 16, 1951 |
| 2,854,724 | Wuorio | Oct. 7, 1958 |
| 2,916,795 | Henderson | Dec. 15, 1959 |

FOREIGN PATENTS

| | | |
|---|---|---|
| 114,310 | Great Britain | Mar. 13, 1919 |